(12) United States Patent
Helfman

(10) Patent No.: US 8,108,437 B2
(45) Date of Patent: Jan. 31, 2012

(54) SORTABLE HASH TABLE

(75) Inventor: Jonathan Helfman, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 702 days.

(21) Appl. No.: 12/138,225

(22) Filed: Jun. 12, 2008

(65) Prior Publication Data

US 2009/0313208 A1 Dec. 17, 2009

(51) Int. Cl.
*G06F 7/544* (2006.01)
(52) U.S. Cl. ........................................ 707/801
(58) Field of Classification Search .......... 707/781, 707/801, 752
See application file for complete search history.

(56) References Cited

U.S. PATENT DOCUMENTS

| | | | | |
|---|---|---|---|---|
| 6,029,170 A * | 2/2000 | Garger et al. | ...... | 1/1 |
| 7,370,054 B1 * | 5/2008 | Martin et al. | ...... | 707/747 |
| 2005/0165827 A1 * | 7/2005 | Schmitt | ...... | 707/102 |
| 2006/0218154 A1 * | 9/2006 | Furusho | ...... | 707/100 |
| 2008/0120479 A1 * | 5/2008 | Dick et al. | ...... | 711/154 |

* cited by examiner

*Primary Examiner* — James Trujillo
*Assistant Examiner* — Soheila Davanlou
(74) *Attorney, Agent, or Firm* — Kilpatrick Townsend & Stockton LLP

(57) ABSTRACT

A method for providing symbolic access to a plurality of objects stored in a data storage is provided. An associative array comprising a plurality of associative array keys and a plurality of associative array values may be generated. A data array comprising a plurality of data array elements may be generated, such that each object stores a sortable property value of the object and an original offset of the object. A mapping table to map original offsets to modified offsets is generated. The mapping table includes a plurality of mapping table elements, and each associative array value is used as an offset into the mapping table, and each mapping table element storing a modified offset, each modified offset is a numeric value used as an offset into the data array.

16 Claims, 7 Drawing Sheets

SORTABLE HASH TABLE

BACKGROUND OF THE INVENTION

1. Field of the Invention

This invention relates generally to data access and, more particularly, to a sortable hash table.

2. Description of the Related Art

In an increasingly competitive world, enterprises are constantly in need of business intelligence that empowers the decision makers in the organization to act on the information, and thus impart extra competitive edge to the organization's products and services. Businesses succeed or fail based on their ability to accurately quantify how many leads become orders, identify their most profitable customers, forecast manufacturing capabilities, manage reliable supply chains, and create sales projections, for example.

However, obtaining information on which decision makers can act presents several practical challenges. One such challenge is the massive amount of data available to the enterprise in today's Information Age. Conversion of data to information which can be readily understood is an obstacle. Additionally, enterprises today have data spread over multiple data sources ranging from legacy systems to relational databases and text files. Even if these problems are surmounted, publishing information in a secure and reliable manner remains another concern for enterprises.

Reporting systems with data visualization functionalities can provide users with the capability to convert diverse data into information that can be easily visualized and deciphered to exploit the information and learn more about the business. Visualization components can emphasize high-level patterns and trends in large and complex datasets.

For many applications, including data visualizations, it is useful to be able to provide access to data through names, categories, strings, or other symbolic and symbolic properties, while also allowing the data to be ordered by some arbitrary function of the data. For example, symbolic access to data can be useful when building a table of data associated with categories, such as a histogram. A histogram is a distributive representation of attributes of data records. In other words, a histogram is a data visualization that tallies the frequency of occurrence of symbols in an input sequence, such as names in a log file. One reason to build such a histogram is to identify the symbols that occur with the highest frequency in the input sequence, such as a familiar top-ten list. To build a histogram, it is desirable to provide access to these symbols in the input data using symbolic properties. Symbolic property access can be accomplished using a hash table.

Thus, histograms are typically created by using a data structure such as a hash table or an associative array, both of which associate a symbol (or string or name or other symbolic property) with a value. Since histograms are a tally of frequency of symbols, in order to identify the symbols (i.e., symbolic property) that occur with the highest frequency in an input sequence, the elements of the hash table need to be sorted by the value (e.g., the frequency). However, hash tables and other data structures that associate symbolic properties with values are designed to support symbolic access. Thus, although hash tables allow fast data access through symbolic properties, hash table entries are typically not re-orderable or sortable. Other data structures, such as arrays, support sorting but do not support symbolic property access.

The typical solution for providing sorting in a hash table, to be used for example for generating a sorted histogram, includes: first, counting the frequency of each symbol (i.e., symbolic property), second, copying unique (hashed) symbols and frequencies to a sortable array, and third, sorting the array.

One disadvantage of the prior solution is that it requires an explicit copy of the hash table contents, occupying more space in memory. A further disadvantage is that by separating the symbolic data (i.e., the hash table) from the ordered data (i.e., the sortable array) the process does not easily support the incremental addition or deletion of data values. Moreover, prior solutions do not provide for access by both symbolic name and access by numeric value using a single methodology.

The Java™ TreeMap class provides a red-black tree implementation of a SortedMap interface. Elements in the Map are be sorted by either a user-provided Comparator object, or by the natural ordering of the keys. Since ordering is determined by the Comparator when the treemap is created, any new object that is added is positioned according to the ordering set out by the Comparator. This is an inflexible solution which does not permit sorting in alternative ways and/or sorting according to the other properties of the object. Moreover, using the Java™ TreeMap class, new objects are sorted as they are added. This requires that the values of the new objects to be known before they are inserted. Such a requirement is problematic, for example, when property values for objects are combined for generating data visualizations such as histograms.

BRIEF SUMMARY OF THE INVENTION

In accordance with an embodiment of the invention, systems and methods for a sortable hash table are provided. In one embodiment, a method for providing symbolic access to a plurality of objects stored in a data storage is provided. An associative array comprising a plurality of associative array keys and a plurality of associative array values may be generated. A data array comprising a plurality of data array elements may be generated, such that each object stores a sortable property value of the object and an original offset of the object. A mapping table to map original offsets to modified offsets is generated. The mapping table includes a plurality of mapping table elements, each associative array value is used as an offset into the mapping table, each mapping table element stores a modified offset, and each modified offset is a numeric value used as an offset into the data array.

In one embodiment, a single data structure provides the benefit of both arrays (i.e., sorting and numeric access) and associative arrays (i.e., symbolic, symbolic access) in a simplified implementation. Additionally, one or more embodiments described herein make it possible to access data in ways that correspond to typical user tasks that are not limited to either numeric access or symbolic access, but rather a combination of both. Thus, programmers can develop software that accesses data both numerically and symbolically and can do so in a simplified and/or transparent manner. Users are able to retrieve data using either a numeric or symbolic identifier. In one embodiment, a function is provided for symbolic access, which uses the symbolic property name, and another function is provided for numeric access, which uses the original numeric offsets even after data is sorted.

A further understanding of the nature and the advantages of the inventions disclosed herein may be realized by reference to the remaining portions of the specification and the attached drawings.

BRIEF DESCRIPTION OF THE DRAWINGS

Various embodiments may best be understood by reference to the following description taken in conjunction with the accompanying drawings in which.

DETAILED DESCRIPTION OF THE INVENTION

The systems and methods described herein provide for sortable hashing using elements such as a hash table or associative array, a data array, and mapping table. For each row in the associative array in one embodiment, the mapping table maps an original offset (i.e., offset into the data array prior to sorting) to a modified offset (i.e., offset into the data array after sorting, splicing, adding, removing, etc.). This exemplary system allows for fast symbolic access by symbolic property name and supports sorting such that data elements can be accessed in numeric order. Thus, data in the data array can be sorted and it is possible to iterate through the data array in sorted order. The hash table application enables both numeric and symbolic property access to data.

In the description that follows, embodiments will be described in reference to subsystems on a platform for a software application, such as a database application. However, embodiments are not limited to any particular architecture, environment, application, or implementation. For example, although embodiments will be described in reference to database applications, aspects of the invention may be advantageously applied to any software application, including software systems or products that benefit from fast data access by symbolic and/or numeric means. Therefore, the description of the embodiments that follows is for purposes of illustration and not limitation.

Figures 1A, 1B:
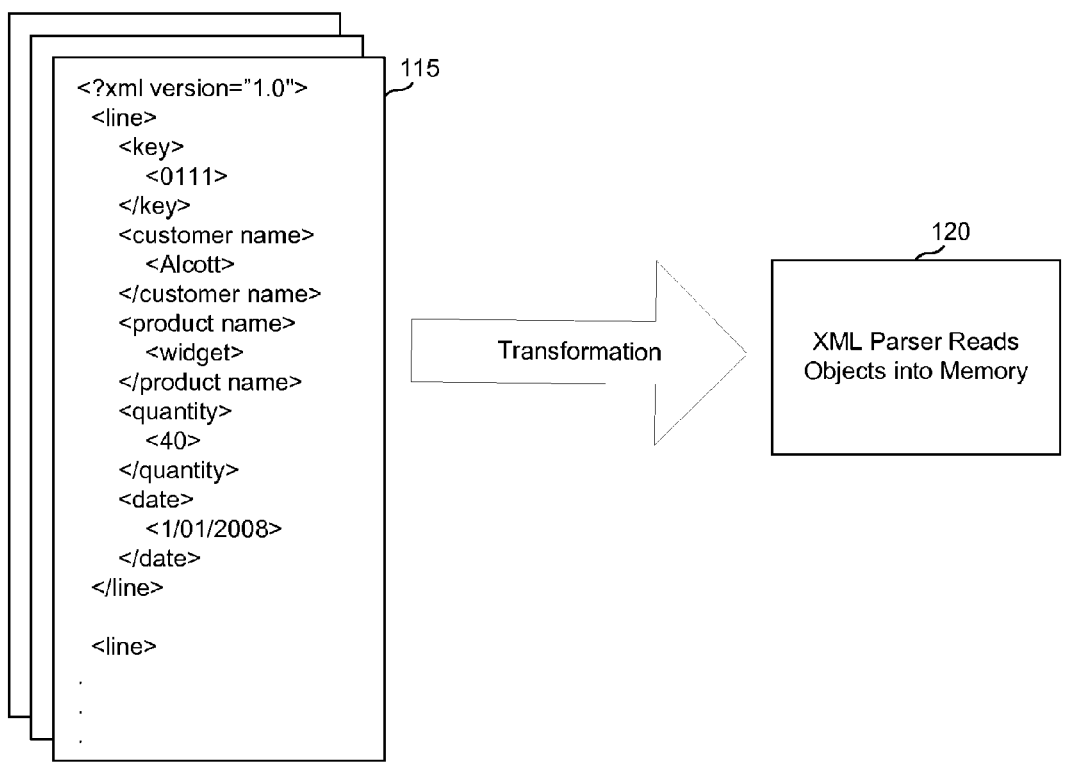
FIG. 1A illustrates an exemplary data table fragment.
FIG. 1B illustrates a form of input data.

FIG. 1A shows a screenshot of an exemplary data table fragment. The data table fragment 100 will be used for purposes of explanation of the various embodiments. As shown, each row of table 100 is an instance of a purchase order class. The purchase order class may have properties that include customer name, product name, quantity of units ordered, and the date that the purchase order was submitted. In one embodiment, each property of the purchase order class is represented as an attribute (e.g., column) in the data table fragment 100. FIG. 1B illustrates a form of input data. In one embodiment, the input data may be in any form. As shown, the input data is an Extensible Markup Language (hereinafter, "XML") document 115. In one embodiment, an XML parser transforms the data in the XML document 115 into objects when the data is read into memory. As used herein, an object is an allocated region of storage or memory.

Figure 2:
FIG. 2 illustrates a simplified block diagram of data objects stored in a sortable hash table application in accordance with one embodiment.

FIG. 2 illustrates a simplified block diagram of data objects stored in a sortable hash table application in accordance with one embodiment. In this embodiment, the sortable hash table application 200 includes an associative array 205, a data array 210, and a mapping table 215. Properties of an object in a property-based language, such as JavaScript, can be used to support symbolic access to the data. By way of example, a symbolic property name is used to access the data element as the value of the specifically named property of the object, where the property itself is a symbolic value, such as a string. JavaScript object properties are a convenient mechanism for emulating symbolic access, but other embodiments may use a hash table or associative array for symbolic access. Like object properties in JavaScript, a Java Hashtable may be used to map strings to values to emulate symbolic access. A Java Hashtable maps a reference of any Java object (e.g. a string object) to a reference of any other Java object (e.g., any data value). Similarly, an associative array maps strings to any data value that might be stored in the array. In one embodiment, the associative array 205 maps each unique symbolic property name (i.e., property) to an original offset using a hash function. As used herein, an original offset is an offset of the property value as it was originally stored in the data array 210 prior to sorting, splicing, etc. The original offset can be used as an offset into the mapping table 215 directly before sorting, splicing, and the like. In one embodiment, the symbolic property name is a key into the associative array 205 and the associative array value associated with each key represents the original offset. Various collision resolution techniques may be applied as needed.

Additionally, the mapping table 215 enables data arrays to be accessed by symbolic property name, even after they are sorted by property values. Moreover, the mapping table 215 can also enable access to the data objects by either symbolic property name or by numeric value in a seamless manner. In one embodiment, the mapping table 215 is used to store a second copy of the original offsets to maintain the mapping of symbolic property names to property values once the property values are sorted and/or spliced. The offset into the mapping table 215 is the associative array data value stored in the associative array 205 (i.e., the original offset). Each element of the mapping table 215 represents an offset into the data array 210, whether sorted or spliced, or not. In one embodiment, where the data array 210 has been sorted, spliced, or otherwise has modified the offsets associated with the stored property values, the mapping table 215 keeps track of all offset modifications that occurred in the data array 210 by storing a modified offset. As used herein, the modified offset is an offset of the property value of the object as it is stored in the data array 210 after sorting, splicing, and the like. The modified offset may be used as an offset into the data array 210 after sorting, adding, or removing objects. Thus, the mapping table 215 maps the original offset of an object with the modified offset. In one embodiment, the mapping table 215 may be implemented as an array, which functions as a look-up-table (LUT).

Furthermore, the data array 210 may be implemented to store the actual data object. In another embodiment, the data array 210 may store a subset of the object's properties. It should be recognized that the associative array 205 and mapping table 215 may be implemented to use one or more pointers for the elements of the tables, rather than numerical values representing offsets.

An example may further illustrate the concepts. Referring to table 100, in the context of data visualizations, a widget manufacturer may want to generate a histogram that compares the total quantity of widgets that were ordered by each customer. Associative array 205 may be generated thereby providing access to the data of table 100 by customer name. The customer name is a symbolic property of the object. In order to generate the associative array 205, each row of table 100 is considered in turn. The customer name (e.g., symbolic property name) is used as a key into the associative array to determine if it is a duplicate. If not, the customer name is added to the associative array 205. Table 100 is shown to include four unique customer names: Alcott, Bronte, Curie, and Dickenson. Each of these customer names serves as a key into the associative array 205. Each element of the associative array represents a mapping of a unique customer name to an original offset of the property value in Data Array 210 that is associated with the customer name.

The sortable hash table application 200 may populate the data array 210, associative array 205, and the mapping table 215. Objects may be stored in the data array 210. In one embodiment, the customer name and the object are provided or determined by the application 200. A new property, "sh_index," may be added to the object. This new variable may represent the original offset of the property value of an object in the data array 210. Each row in table 100 may be stored in the data array 210 in a similar manner.

Multiple objects may have the same property name and thus may map to a single offset in the data array 210, such as where a customer name (i.e., symbolic property) appears multiple times in the table 100. For example, there are three rows that have the Alcott customer name. In one embodiment, the application 200 determines that an object has already mapped to the offset and may replace the pre-existing object's property value with a new object's property value, or store property values of multiple objects. Resolution techniques may be used whereby multiple objects that have the same property name and thus map to the same offset in the data array 210, are implemented as a linked list. By using the linked list, multiple objects that have the same property name can coexist at the same offset. In yet another embodiment, certain applications may not require all of the information associated with the object and may only require, for example, cumulative data. In the histogram example, only the cumulative value of the quantity of widgets ordered by each customer need be determined. As such, where multiple objects are mapped to a single offset, the data array 210 may store the cumulative value of the quantity of widgets ordered as a new property of the object. Other embodiments of determining the value to be stored in the data array 210 are also contemplated without departing from the scope of the embodiments described herein.

The associative array 205 is also populated. The association between the customer name and the original offset may be stored in the associative array 205, for example, by using the provided or determined customer name as the key into the associative array 205 and storing the value of the original offset in the corresponding element of the associate array 205. In one embodiment, the associative array 205 stores keys, such as the customer name, and stores associative array values, such as original offsets. In one embodiment, the keys are determined by any of the object's properties and/or property's values. A property is treated as an associative array key that can be used to later to lookup a property value using the property name.

In one embodiment, the mapping table 215 is populated. The associative array values (i.e., original offset) are stored as the element in the associative array 205, and are used as offsets into the mapping table 215. The elements of the mapping table are also populated. Initially, before sorting, the mapping table 215 elements include only the original offsets. As will be explained, the mapping table 215 elements are updated to represent modified offsets when the data array 210 is sorted, spliced, etc. Thus, the mapping table 215 includes elements which correspond with the modified offsets. After populating the data array 210, associative array 205, and the mapping table 215 with one or more objects, various operations may be performed such as sorting, retrieving, splicing, adding, and removing data.

Figure 3:
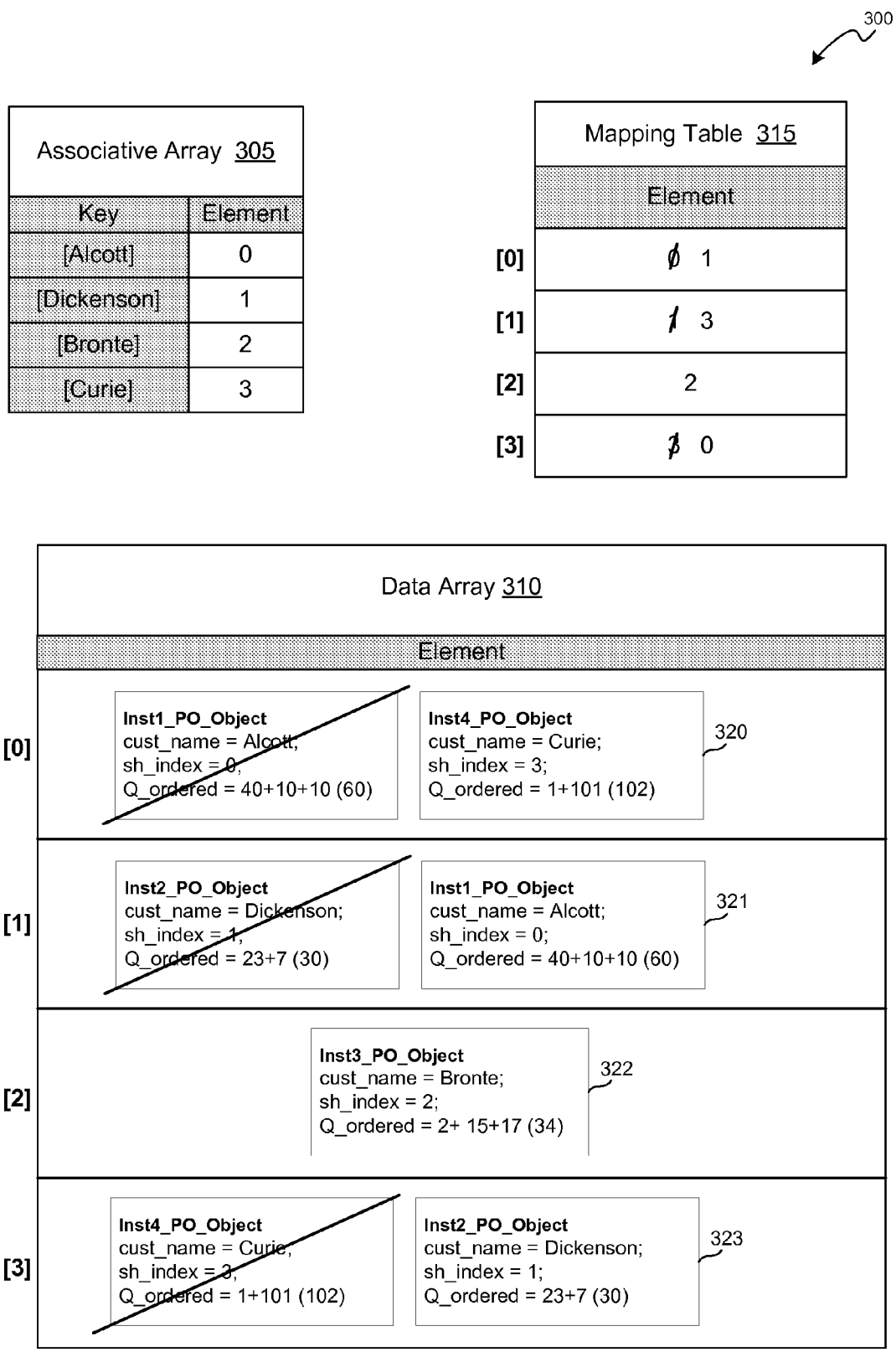
FIG. 3 illustrates a simplified block diagram of sorted data objects in a sortable hash table application in accordance with one embodiment.

FIG. 3 illustrates a simplified block diagram of sorted data objects in a sortable hash table application in accordance with one embodiment of the present invention. The sortable hash table application 300 includes an associative array 305, a data array 310, and a mapping table 315. The property values of data array 310 may be ordered, such as sorted in descending or ascending order, from the highest numerical value of a property of the object to the lowest, and vice versa. As shown, the objects of data array 310 are sorted in descending order based on the quantity ordered property (i.e., "Q_ordered"). The object with customer name Curie 320 has the highest Q_ordered with a value of 102 units, customer name Alcott 321 has the second highest Q_ordered with a value of 60 units, customer name Bronte 322 has the third highest Q_ordered with a value of 34 units, and customer name Dickenson 323 has the lowest Q_ordered with a value of 30 units. Thus, Curie 320 is placed in the first position at [0], Alcott 321 is placed the second position at [1], Bronte 322 is placed in the third position at [2], and Dickenson 323 is placed in the last position at [3].

In order to properly track the modified offsets in the sorted data array 310, the mapping table 315 is updated to reflect the correct mapping between the original offset and the modified offset for each symbol (i.e., customer name). One embodiment for updating the mapping table 315 includes determining the value of the original offset property for each data array 310 element. This original offset value may then be used to reorder the mapping table 315. Then the element that corresponds with the position in the mapping table is replaced with the modified offset value. In the data array 310, for example, sh_index=0 represents the original mapping of the object with customer name Alcott. After sorting, the object with customer name Alcott 321 is relegated to the second position in data array 310 at [1]. Thus, the original offset represented by sh_index=0 for Alcott 321 is used as position [0] in the mapping table 315, and the element in the mapping table 315 is updated with the numerical value of the modified offset for Alcott, which is 1. In one embodiment, updating the mapping table 315 after sorting includes traversing the data array 310 and mapping table 315 until all necessary updates have been made. This can be accomplished using a single pass through the data array 310.

Figure 4:
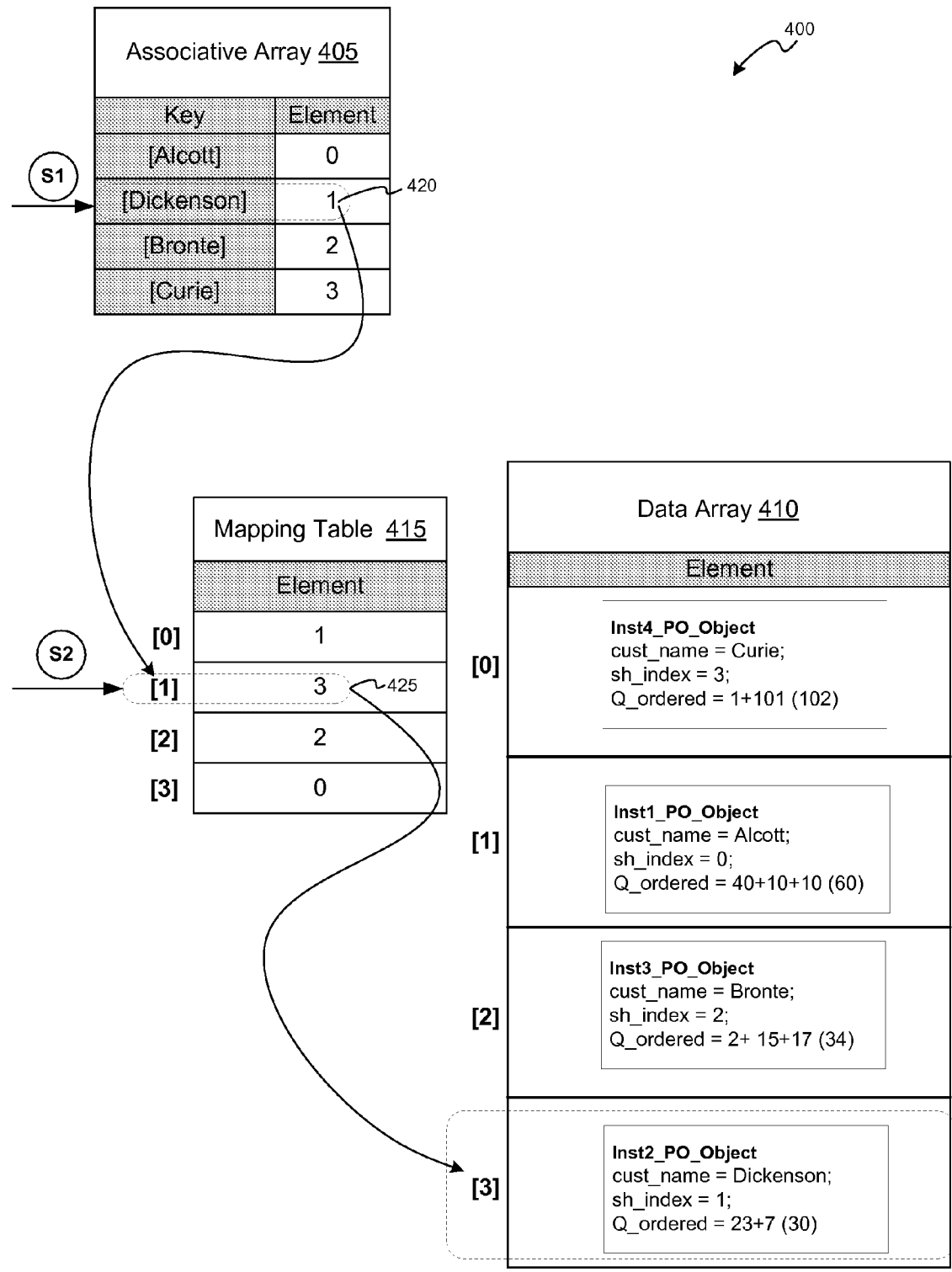
FIG. 4 illustrates a simplified block diagram of symbolic and numeric access of data objects in a sortable hash table application in accordance with one embodiment.

FIG. 4 illustrates a simplified block diagram of symbolic and numeric access of data objects in a sortable hash table application in accordance with one embodiment. The sortable hash table application 400 includes an associative array 405, a data array 410, and a mapping table 415. The application 400 may be used for both numeric and symbolic access to the data in a manner that is seamless to the user.

In a first embodiment, symbolic access to the data may be performed by using a symbolic property as a key into the associative array 405. The element at the associative array 405 that is associated with the key is determined. This value may represent the original offset 420. The original offset may then be used as the offset to the mapping table 415. The value at the corresponding mapping table 415 element is determined. This value may represent the modified offset. The modified offset may then be used as the offset into the data array 410. The corresponding data array 410 element may include property values of one or more objects that match the symbolic property (i.e., property name). In one embodiment, the elements of the data array 410 include all or a subset of the object's properties.

By way of example as depicted at step S1 in FIG. 4, for symbolic access to the data in table 100 using system 400, a symbolic property (i.e., property name), such as "Dickenson," may be determined or received. The key "Dickenson" may be used as the key into the associative array 405. The associated element represents the original offset 420 which is determined to be "1." The original offset 420 is then used as the offset into the mapping table 415. The corresponding element in the mapping table 415 represents the modified offset 425 which is determined to be "3." The modified offset 425 is then used as the offset into the data array 410 and the corresponding element represents property values of the one or more objects that have a customer name (i.e., property name) that matches the symbolic property "Dickenson." In the depicted embodiment, two objects with customer name "Dickenson" are included in the element corresponding to offset [3] of the data array 410. Moreover, a cumulative value of the quantity ordered property (i.e., "Q_ordered=30") for both of the "Dickenson" objects are stored in the element. A first object had a Q_ordered value of 23 and a second object had a Q_ordered value of 7. As previously described, all or any subset of property values of both objects of customer name "Dickenson" may be stored in the data array 410. Thus, objects which have been sorted based on values of a property may be accessed using a symbolic property, such as a property name.

Moreover, numeric access to the data may be performed by using a numeric property as an offset into the mapping table 415. The numeric property may represent the original offset, for example, if the user does not know a property name of the customer, but knows the order in which the customer was first stored in the data array 410. In another embodiment, data in the data array can be sorted and it is possible to iterate through the data array in sorted order. The value at the mapping table 415 element that corresponds to the original offset is determined. This value may represent the modified offset. The modified offset may then be used as the offset into the data array 410. The corresponding data array 410 element may include property values of one or more objects that match the numeric property. In one embodiment, the elements of the data array 410 include all or a subset of the object's properties.

By way of example as depicted at step S2 in FIG. 4, for numeric access to the data in table 100 using system 400, a numeric property, such as "1" may be determined or received. The value "1" may represent the original offset and may be used as the offset into the mapping table 415. The corresponding element in the mapping table 415 represents the modified offset 425 and is determined to be "3." The modified offset 425 is then used as an offset into the data array 410 and the corresponding element includes property values of the one or more objects which has an original offset that matches the numeric property. As shown, position [3] in the data array 310 has the sh_index=1, which matches the initial offset value "1." Thus, objects which have been sorted, spliced, or otherwise moved within the data array 410 may still be accessed using a numeric property. Numeric access is enabled by the mapping table 415 which effectively maintains the proper mapping between the original offset and the modified offset notwithstanding changed placements of objects within the data array 410.

The ability to access sorted data using symbolic properties may be particularly helpful in the context of treemap data visualizations (not to be confused with the Java™ TreeMap class). In one embodiment, a tree map may be constructed based on a specified hierarchy. For example, a hierarchy may require that a color characteristic of the tree map be mapped to the customer name of the object and an area characteristic be mapped to the quantity of units ordered property of the object. The sortable hash application 400 may be used to construct the tree map. The associative array 405 may be constructed to create a subtree for each customer name, or other symbolic property name. In one embodiment, the quantities of the units ordered may then be stored in one or more leaf nodes of the tree. In order to render the treemap for the specified hierarchy, the leaf nodes may be sorted within each subtree by the quantity property. Sorting by the property that is mapped to area is needed so that the layout method can position the largest areas first. Thus, the sortable hash application 400 builds the tree by object name while enabling the tree to be sorted by a value of an object's property.

Figure 5:
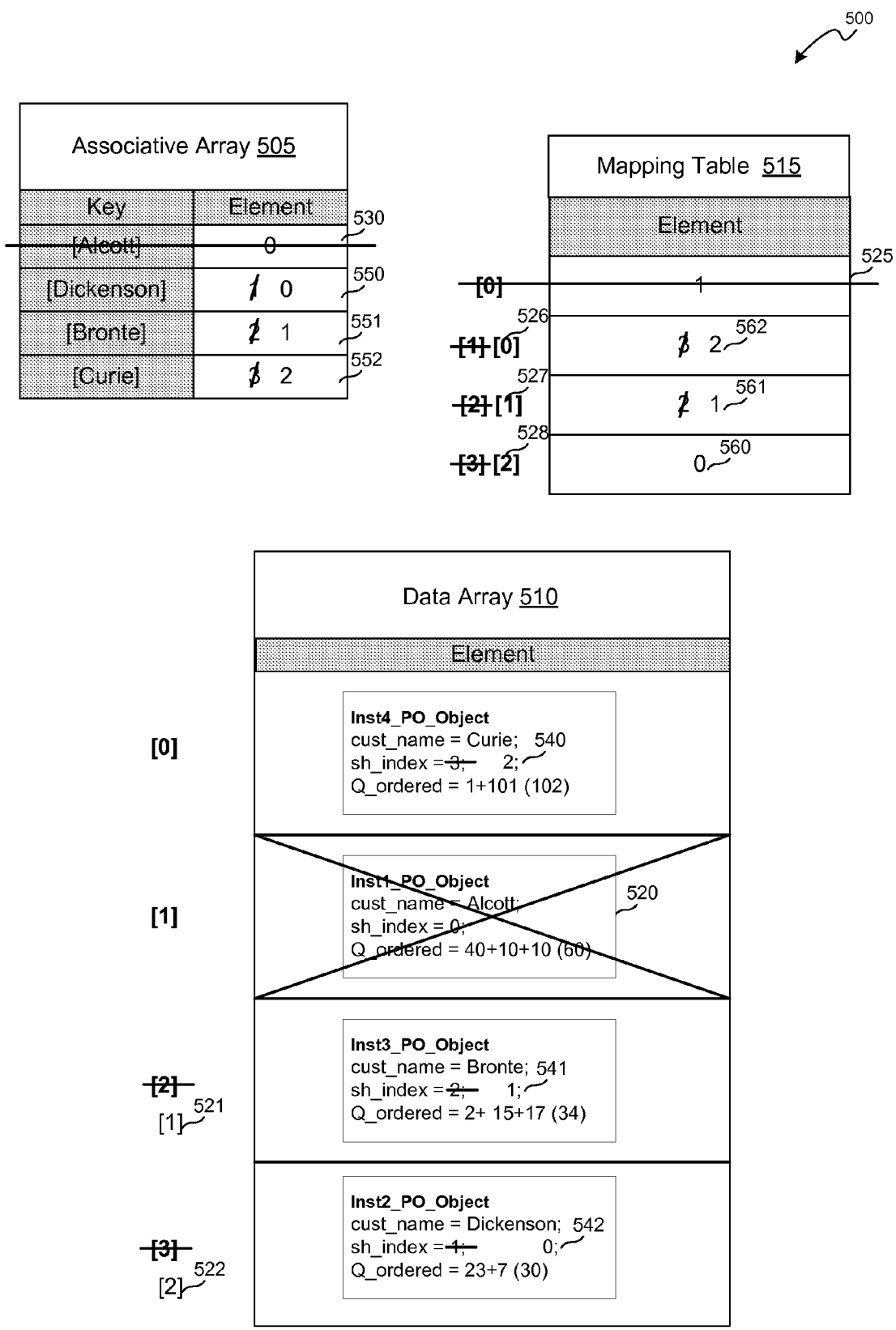
FIG. 5 illustrates a simplified block diagram of deletion-handling of data objects in a sortable hash table application in accordance with one embodiment.

FIG. 5 illustrates a simplified block diagram of the removal of data objects in a sortable hash table application in accordance with one embodiment of the present invention. Removal of objects may be useful in the context of data visualizations, for example, where the user requests a representation of the data to exclude outlier customers. In another embodiment, customer records may be removed after a period of time or if the relationship with the customer has terminated. The sortable hash table application 500 includes an associative array 505, a data array 510, and a mapping table 515. In a first embodiment, removal or deletion of an element from the sortable hash table application 500 may be performed by removing a corresponding element from the data array 510, mapping table 515, and associative array 505, and finally adjusting the element values as needed.

Removing an element from the data array 510 may include determining or receiving a symbolic property (i.e., property name) of the element to be removed. The property name is used as the key into the associative array 505. The original offset is determined from the corresponding element in the associative array 505. The original offset value may be used as an offset into the mapping table 515. The corresponding element at the mapping table 515 is determined. This value may represent the modified offset. The modified offset is then used as an offset into the data array 510. The corresponding element stored in the data array 510 is then removed from the array 510.

The element may also be removed from the mapping table 515. The original offset may be used as an offset into the mapping table 515. The corresponding element may then be removed from the table 515. Finally, the element may be removed from the associative array 505. The symbolic property of the element to be removed may be used as a key into the associative array 505. The corresponding element may then be removed from the associative array 505.

After the element has been removed from the application 500, the offsets into the associative array 505, a data array 510, and a mapping table 515 may require adjustment. In another embodiment, the offset numerical values are updated automatically (i.e., elements are shifted) for the remaining elements, for example, if using the JavaScript splice( ) function. In one embodiment, objects are shifted in the data array 510 to fill-in any gaps caused from removal of elements.

Additionally, the elements of the data array 510 and mapping table 515 may require adjustment (i.e., renumbering). As previously mentioned, the elements of the data array 510 represent one or more objects. During the store function, each element may have been modified to include an sh_index property to indicate the original offset of the object. Those elements which were originally positioned after the removed element may require an update for the sh_index property. In one embodiment, the update may include renumbering by decrementing the sh_index value. To identify those elements which require their sh_index to be updated, the system 500 may traverse each element in the data array 510 and compare the sh_index property for each element with the original offset value of the removed element. If the sh_index value of the element in the data array 510 is greater than the removed element's original offset, then the sh_index is updated.

Since the original offset values are also represented in the elements of the associative array 505, the associative array 505 elements may also require adjustment (i.e., renumbering). For each object in the data array 510 that required a change in the sh_index property, the same change is propagated to the corresponding element in the associative array 505. In one embodiment, the changes may be propagated by traversing each element of the associative array 505 and comparing the element value (i.e., the original offset) with the original offset value of the removed element. If the element value in the associative array 505 is greater than the removed element's original offset, then the element value in the associative array is updated.

By way of example, as shown in FIG. 5, the object with the customer name "Alcott" is removed from the application 500. The element 520 in the data array 510 corresponding to the customer name "Alcott" is determined and removed from the data array 510. Using the associative array 505, it is determined that the original offset of the removed element, "Alcott" is "sh_index=0." In one embodiment, the removal may be accomplished by using the Javascript splice( ) function, which shifts the remaining elements in the data array 510 in order to fill-in gaps resulting from removal of the element. Accordingly, the element with customer name Bronte is shifted to position [1] as indicated by the updated offset 521, the element with customer name Dickenson is shifted to position [2] as indicated by the updated offset 522.

Next, the element 525 corresponding with the "Alcott" object is removed from the mapping table 515. Again, the removal of the element may require adjustment of the offsets for the remaining elements. As previously described, this adjustment may be automatically provided, such that the offsets of the remaining elements which are positioned after the removed element are shifted. For example, position [1] is shifted to [0] as indicated by the updated offset 526, position [2] is shifted to [1] as indicated by the updated offset 527, and position [3] is shifted to [2] as indicated by the updated offset 528. Finally, the element 530 corresponding with the "Alcott" object may be removed from the associative array 505.

In the embodiment as shown, the element values which represent the original offsets require adjustment by renumbering. In one embodiment, the elements of the data array 510 which have a value of the sh_index (i.e., original offset) that is greater than the original offset of the removed element are adjusted. As shown, the sh_index for the "Curie" element is a "3" which is greater than the original offset of "Alcott" which held a value of "1." Thus, the sh_index of "Curie" is renumbered to "2" as indicated by the updated sh_index 540. Likewise, the sh_index of "Bronte" is renumbered to "1" as indicated by the updated sh_index 541 and the sh_index of "Dickenson" is renumbered to "0" as indicated by the updated sh_index 542.

Furthermore, the elements of the associative array 505 (i.e., original offsets) also require adjustment after the removal of the "Alcott" object. Each element of the associative array 505 which has an associative array value (i.e., original offset) that is greater than the original offset of the removed element are adjusted. As shown, the element corresponding to the "Dickenson" original offset is renumbered to "0" as indicated by the updated offset 550, since the original offset of "1" is greater than Alcott's original offset of "0." Likewise, the element corresponding to the "Bronte" original offset is renumbered to "1" as indicated by the updated offset 551, and element corresponding to the "Curie" original offset is renumbered to "2" as indicated by the updated offset 552.

In addition to updating the associative array 505, the elements in the mapping table 515 may also require adjustment. As previously mentioned, the offset into the mapping table 515 represents the original offset and the values associated with each of these original offsets represents the modified offset. If elements of the data array 510 were shifted, for example, to fill-in gaps caused from removal, the mapping table 515 needs to be updated to reflect the new offset values associated with the shifted elements. An exemplary method for accomplishing such includes, for each element in the data array 510, determining the modified offset and the updated sh_index value. Using the updated sh_index as an offset into the mapping table 515, the corresponding element value is replaced with the modified offset value. Accordingly, the "Curie" object includes an updated sh_index 540 with a value of "2," which is used as an offset into the mapping table at the updated offset 528. The corresponding element 560 need not be renumbered because the element in the data array 510 for "Curie" was not shifted. The "Bronte" object includes an updated sh_index 541 with a value of "1," which is used as an offset into the mapping table at the updated original offset 527. The corresponding element is renumbered to "1" as indicated by the updated modified offset 561. The value of the updated modified offset 561 is determined by the value of the modified offset 521 in the data array 510. Lastly, the "Dickenson" object includes an updated sh_index 542 with a value of "0," which is used as an offset into the mapping table at the updated original offset 526. The corresponding element is renumbered to "2" as indicated by the updated modified offset 562. The value of the updated modified offset 562 is determined by the value of the modified offset value 522 in the data array 510. In one embodiment, updating the mapping table 515 to reflect the correct mapping of original offsets to modified offsets after removal of one or more elements is performed in the same manner of updating the mapping table 515 after sorting.

Figure 6:
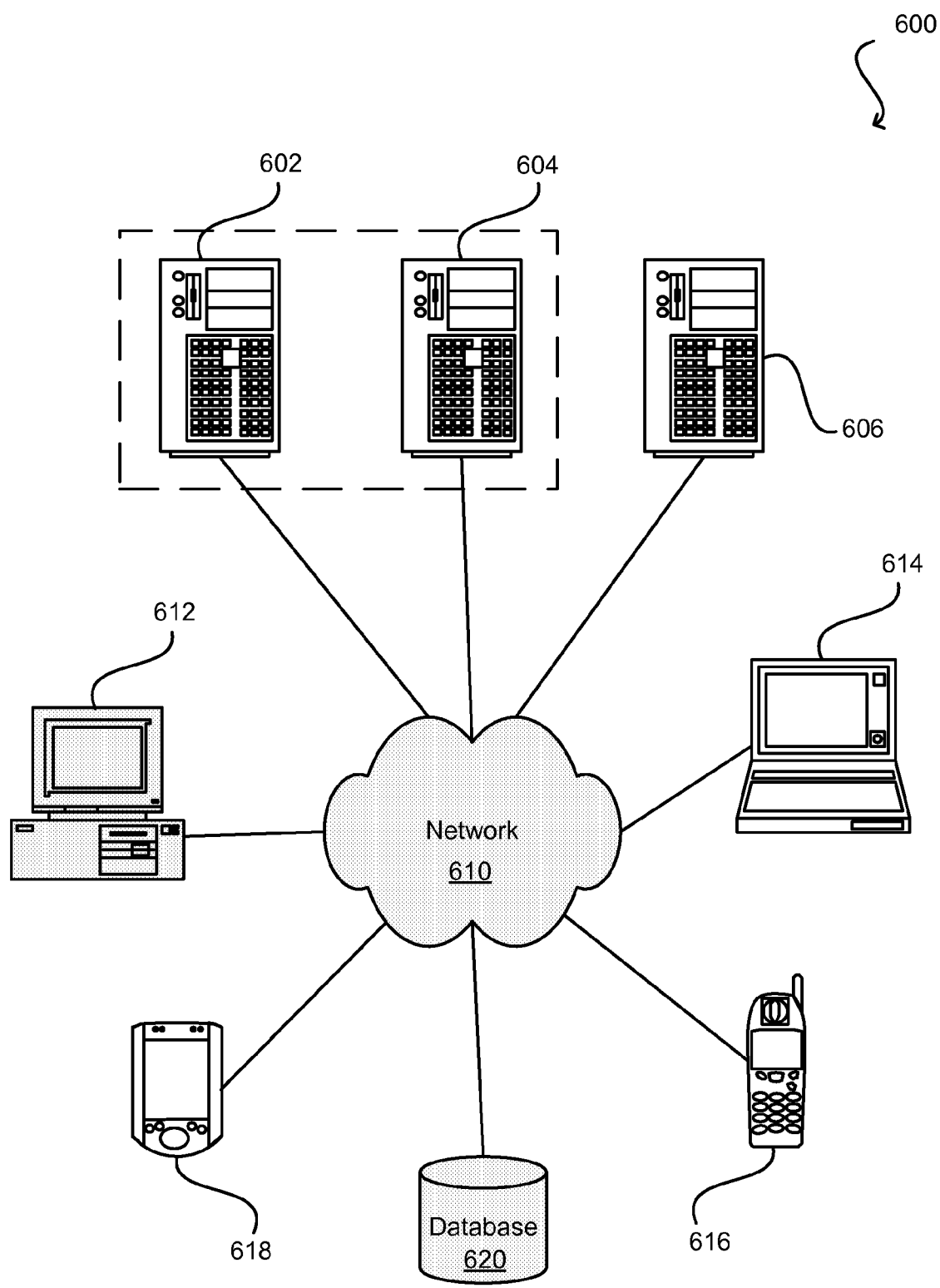
FIG. 6 is a block diagram illustrating components of an exemplary operating environment in which various embodiments may be implemented.

FIG. 6 is a block diagram illustrating components of an exemplary operating environment in which various embodiments of the present invention may be implemented. The system 600 can include one or more user computers, computing devices, or processing devices 612, 614, 616, 618, which can be used to operate a client, such as a dedicated application, web browser, etc. The user computers 612, 614, 616, 618 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 612, 614, 616, 618 may also have any of a variety of applications, including one or more development systems, database client and/or server applications, and Web browser applications. Alternatively, the user computers 612, 614, 616, 618 may be any other electronic device, such as a thin-client computer, Internet-enabled gaming system, and/or personal messaging device, capable of communicating via a network (e.g., the network 610 described below) and/or displaying and navigating Web pages or other types of electronic documents.

Although the exemplary system 600 is shown with four user computers, any number of user computers may be supported.

In most embodiments, the system 600 includes some type of network 610. The network may can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 602, 604, 606 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 606) may be dedicated to running applications, such as a business application, a Web server, application server, etc. Such servers may be used to process requests from user computers 612, 614, 616, 618. The applications can also include any number of applications for controlling access to resources of the servers 602, 604, 606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 612, 614, 616, 618. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 612, 614, 616, 618.

The system 600 may also include one or more databases 620. The database(s) 620 may reside in a variety of locations. By way of example, a database 620 may reside on a storage medium local to (and/or resident in) one or more of the computers 602, 604, 606, 612, 614, 616, 618. Alternatively, it may be remote from any or all of the computers 602, 604, 606, 612, 614, 616, 618, and/or in communication (e.g., via the network 610) with one or more of these. In a particular set of embodiments, the database 620 may reside in a storage-area network ("SAN") familiar to those skilled in the art. Similarly, any necessary files for performing the functions attributed to the computers 602, 604, 606, 612, 614, 616, 618 may be stored locally on the respective computer and/or remotely, as appropriate. In one set of embodiments, the database 620 may be a relational database, such as Oracle 10g, that is adapted to store, update, and retrieve data in response to SQL-formatted commands.

Figure 7:
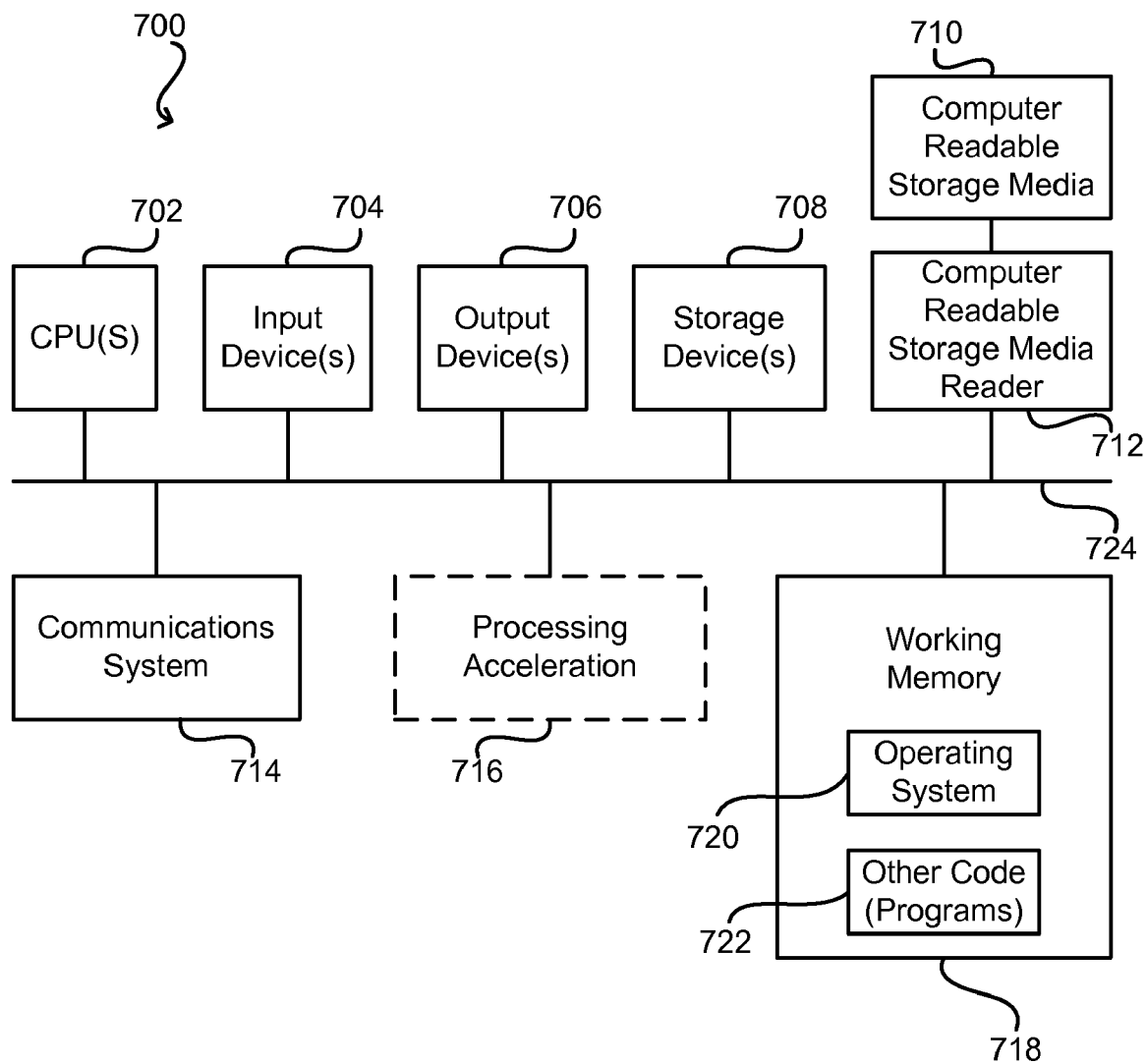
FIG. 7 illustrates an exemplary computer system in which various embodiments may be implemented.

FIG. 7 illustrates an exemplary computer system 700, in which various embodiments of the present invention may be implemented. The system 700 may be used to implement any of the computer systems described above. The computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The computer system 700 may also include one or more storage devices 708. By way of example, the storage device(s) 708 can include devices such as disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 712, a communications system 714 (e.g., a modem, a network card (wireless or wired), an infra-red communication device, etc.), and working memory 718, which may include RAM and ROM devices as described above. In some embodiments, the computer system 700 may also include a processing acceleration unit 716, which can include a digital signal processor DSP, a special-purpose processor, and/or the like.

The computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing computer-readable information. The communications system 714 may permit data to be exchanged with the network and/or any other computer described above with respect to the system 700.

The computer system 700 may also comprise software elements, shown as being currently located within a working memory 718, including an operating system 720 and/or other code 722, such as an application program (which may be a client application, Web browser, mid-tier application, RDBMS, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims. For example, the teachings herein may be extended to cover data access for applications other than data visualizations. The scope of the invention should, therefore, be determined not with reference to the above description, but instead should be determined with reference to the pending claims along with their full scope or equivalents.

What is claimed is:

1. A method comprising:
providing an associative array comprising a plurality of entries corresponding to a plurality of symbolic properties, each entry in the plurality of entries associating a corresponding symbolic property in the plurality of symbolic properties with a value;
providing a data array comprising a plurality of data array elements, each element in the data array storing a symbolic property from the plurality of symbolic properties and a sortable property value;
storing a mapping table comprising a plurality of mapping table elements, each mapping table element storing an offset value, wherein, for each entry in the associative array associating a symbolic property with a value, the value identifies a mapping table element in the mapping table corresponding to the entry and the offset value stored by the corresponding mapping table element is indicative of a data array element storing the symbolic property; and
for a first symbolic property from the plurality of symbolic properties, accessing a first data array element of the plurality of data array elements storing the first symbolic property using the associative array and the mapping table.

2. The method of claim 1, further comprising:
sorting data array elements based upon the sortable property value stored by each data array element.

3. The method of claim 2, further comprising:
determining a modified offset value indicative of a changed position of the first data array element within the data array after the sorting; and
updating an offset value stored by a first mapping table element for the first data array element with the modified offset value.

4. The method of claim 3, wherein the updating further comprises:
locating the first mapping table element in the mapping table; and
changing the offset value stored by the first mapping table element to the modified offset.

5. The method of claim 4, wherein the locating the first mapping table element includes using the first associative array value.

6. The method of claim 1, wherein accessing the first data array element further includes:
determining a first entry in the associative array using the first symbolic property;
determining a first value associated with the first entry in the associative array;
determining a first mapping table element in the mapping table using the first value; and
accessing the first data array element in the data array using a first offset value stored by the first mapping table element.

7. The method of claim 1, further comprising:
accessing the data array element using a numeric property.

8. The method of claim 7, wherein accessing the first data array element further includes:
determining a first mapping table element in the mapping table using a first numeric property; and
accessing the second data array element in the data array using a first offset value stored by the first mapping table element.

9. The method of claim 1, further comprising:
accessing the sortable property value of each data array element in sorted order using at least one of a numeric property and a symbolic property.

10. The method of claim 1, further comprising:
determining a first entry in the associative array for removal using the first symbolic property;
determining a first value associated with the first entry in the associative array;
determining a first mapping table element in the mapping table using the first value;
accessing the first data array element in the data array using a first offset value stored by the first mapping table element;
removing the first data array element from the data array; and
removing the first mapping table element from the mapping table.

11. A system comprising:
a memory; and
a processor configured to:
cause an associative array to be stored in the memory, the associative array comprising a plurality of entries corresponding symbolic properties, each entry in the plurality of entries associating a corresponding symbolic property in the plurality of symbolic properties with a value;
cause a data array to be stored in the memory, the data array comprising a plurality of data array elements, each element in the data array storing a symbolic property from the plurality of symbolic properties and a sortable property value;
cause a mapping table to be stored in the memory, the mapping table comprising a plurality of mapping table elements, each mapping table element storing an offset value, wherein, for each entry in the associative array associating a symbolic property with a value, the value identifies a mapping table element in the mapping table corresponding to the entry and the offset value stored by corresponding mapping table element is indicative of a data array element storing the symbolic property.

12. The system of claim 11, wherein the data array elements are sorted based upon the sortable property value stored by each data array element.

13. A non-transitory computer-readable medium storing a computer program product executed by a processor, the computer program product comprising:
code for providing an associative array comprising a plurality of entries corresponding to a plurality of symbolic properties, each entry in the plurality of entries associating a corresponding symbolic property in the plurality of symbolic properties with a value;

code for providing a data array comprising a plurality of data array elements, each element in the data array storing a symbolic property from the plurality of symbolic properties and a sortable property value; and code for storing a mapping table comprising a plurality of mapping table elements, each mapping table element storing an offset value, wherein, for each entry in the associative array associating a symbolic property with a value, the value identifies a mapping table element in the mapping table corresponding to the entry and the offset value stored by the corresponding mapping table element is indicative of a data array element storing the symbolic property.

14. The non-transitory computer-readable medium of claim 13, wherein the computer program product further comprising:

code for sorting the data array elements based upon the sortable property value stored by each data array element.

15. The non-transitory computer-readable medium of claim 14, wherein the computer program product further comprising:

code for determining a modified offset value indicative of a changed position of the first data array element within the data array after the sorting; and code for updating an offset value stored by a first mapping table element for the first data array element with the modified offset value.

16. The non-transitory computer-readable medium of claim 15, wherein the computer program product further comprising:

code for locating the first mapping table element in the mapping table; and code for changing the offset value stored by the first mapping table element to the modified offset.

* * * * *

UNITED STATES PATENT AND TRADEMARK OFFICE
CERTIFICATE OF CORRECTION

| | | |
|---|---|---|
| PATENT NO. | : 8,108,437 B2 | Page 1 of 1 |
| APPLICATION NO. | : 12/138225 | |
| DATED | : January 31, 2012 | |
| INVENTOR(S) | : Helfman | |

It is certified that error appears in the above-identified patent and that said Letters Patent is hereby corrected as shown below:

In column 2, line 20, after "to" delete "the".

In column 9, line 27, delete "Javascript" and insert -- JavaScript --, therefor.

In column 14, lines 32-33, in Claim 11, after "corresponding" insert -- to a plurality of --.

In column 14, line 41, in Claim 11, after "value;" insert -- and --.

In column 14, line 49, in Claim 11, after "by" insert -- the --.

Signed and Sealed this
Eighth Day of May, 2012

David J. Kappos
*Director of the United States Patent and Trademark Office*